United States Patent
Hovater et al.

(12) 
(10) Patent No.: US 6,483,858 B1
(45) Date of Patent: Nov. 19, 2002

(54) INJECTION MODE-LOCKING TI-SAPPHIRE LASER SYSTEM

(75) Inventors: James Curtis Hovater, Seaford, VA (US); Bernard Matthew Poelker, Newport News, VA (US)

(73) Assignee: Southeastern University Research Assn., Newport News, VA (US)

( * ) Notice: Subject to any disclaimer, the term of this patent is extended or adjusted under 35 U.S.C. 154(b) by 0 days.

(21) Appl. No.: 09/447,874

(22) Filed: Nov. 23, 1999

(51) Int. Cl.[7] .............................. H01S 3/98; H01S 3/09; H01S 3/08
(52) U.S. Cl. .............................. 372/18; 372/21; 372/22; 372/69; 372/70; 372/92; 372/93; 372/94
(58) Field of Search .............................. 372/18, 21, 22, 372/92, 93, 94, 97, 69, 70

(56) References Cited

U.S. PATENT DOCUMENTS

| | | | | |
|---|---|---|---|---|
| 5,185,750 A | * | 2/1993 | Kafka et al. | 372/18 |
| 5,297,156 A | * | 3/1994 | Deacon | 372/21 |
| 5,594,745 A | * | 1/1997 | Oka | 372/21 |
| 6,088,379 A | * | 7/2000 | Owa et al. | 372/97 |

* cited by examiner

Primary Examiner—Paul Ip
Assistant Examiner—Cornelius H. Jackson

(57) ABSTRACT

According to the present invention there is provided an injection modelocking Ti-sapphire laser system that produces a unidirectional laser oscillation through the application of a ring cavity laser that incorporates no intracavity devices to achieve unidirectional oscillation. An argon-ion or doubled Nd:YVO$_4$ laser preferably serves as the pump laser and a gain-switched diode laser serves as the seed laser. A method for operating such a laser system to produce a unidirectional oscillating is also described.

10 Claims, 1 Drawing Sheet

INJECTION MODE-LOCKING TI-SAPPHIRE LASER SYSTEM

The United States of America may have certain rights to this invention under Management and Operating contract No. DE-AC05-84ER 40150 from the Department of Energy.

FIELD OF THE INVENTION

The present invention relates to the field of injection mode-locked lasers and more particularly to a high pulse rate, ring cavity mode-locking Ti-sapphire laser systems.

BACKGROUND OF THE INVENTION

At many electron accelerators through out the world, there is great interest in developing high duty factor, high average power (>1W) laser systems with picosecond pulsewidths and repetition rates synchronized to the accelerating cavity RF frequency. Such a laser system can be used to extract electrons from a high-voltage semiconductor-photocathode electron gun during the portion of the RF cycle when electrons are accelerated into the machine. In this way, all of the photoemitted electrons are accelerated and delivered to the ultimate user of the beam; none are wasted as is the case when a DC laser light source is used to create a DC electron beam that must be chopped and bunched prior to injection into the accelerator. This efficient use of the extracted electrons helps prolong the lifetime of the photocathode. Laser systems for this application must emit pulses with gigahertz repetition rates. For example, at the Jefferson National Accelerator Facility, a diode laser system with a pulse repetition rate of 1.497 GHz provides electron beam to three nuclear physics experiment halls. Electron accelerators such as the Mainz Microtron at Mainz, Germany and the MIT Bates Linear Accelerator require pulse repetition rates of 2.445 and 2.856 GHz, respectively. The next generation of electron accelerators may require pulsed laser systems with comparable, if not higher, repetition rates. Other accelerator applications such as Compton polarimetry and gamma ray photon sources may also benefit from the availability of high average power, high repetition rate laser systems.

Diode laser systems meet many of the pulse requirements described above but provide an average output power less than 500 mW. Commercial modelocked Ti-sapphire lasers are high power, tunable light sources, however, their pulse repetition rates are typically less than 100 MHz. These lasers are designed to emit high peak power, femtosecond pulses and this necessitates that the cavity length be long enough to accommodate optics (for example, prism pairs) used to compensate for group velocity dispersion within the Ti-sapphire crystal. In a recent publication, Hoffmann et al. ( Nuclear Instrumentation and Methods A 379 (1996) 15) describe a small, Kerr-lens modelocked Ti-sapphire laser with high average power and a pulse repetition rate of 1.039 GHz. Kerr-lens modelocked lasers, however, sometimes cease pulsing and must be "restarted", a condition unacceptable for reliable photoinjection. Basu et al. (Optical Letters, 14 (1989) 1272) used a gain-switched diode laser to injection seed a Ti-sapphire laser pumped with a Q-switched, frequency-doubled Nd:YAG laser. They obtained 19.4 ps (FWHM) pulses at a rate of 200 MHz within the Q-switched macropulse. In a similar manner, in our paper (Hovater et al, Nuclear Instrumentation and Methods in Physics Research A 418 1998) 280–284) we used a gain-switched diode laser to modelock a slightly modified, commercial standing-wave Ti-sapphire laser. In contrast to the work reported by Basu et al., according to our development, the pulse repetition rate of the modelocked Ti-sapphire laser was varied by setting the diode seed laser repetition rate equal to different multiples of the Ti-sapphire laser cavity fundamental frequency. Pulse repetition rates from 223 MHz to 1.56 GHz were observed with 700 mW average output power for all repetition rates. In this manner, gigahertz repetition rates are obtained with a manageable cavity length (i.e., 67 cm rather than <15 cm). No intracavity modelocking elements are necessary. The gain-switched diode laser serves as a simple, stable master oscillator; it is a trivial matter to obtain gain-switched pulse repetition rates to 4 GHz suggesting that operation at even higher repetition rates may be achieved with this method. The Ti-sapphire laser described here is not actively stabilized yet phase noise measurements indicate timing jitter was relatively low; 2.5 ps at a 223 MHz pulse repetition rate.

In our above-referenced 1998 paper, which is hereby incorporated in its entirety by reference, we described and utilized a linear folded cavity that produced a bi-directional laser oscillation. This effect resulted in "wasting" of the Ti-sapphire laser light that exited through the input coupler of the first laser described in that paper. It would be highly more desirable and efficient if all of the Ti-sapphire light were used productively.

As described in the prior art, unidirectional laser oscillation that permits efficient use of substantially all of the Ti-sapphire light produced can be achieved through the use of ring cavity lasers that incorporate one or more intracavity devices. Such intracavity devices are unappealing because they add complexity to the laser design and also add loss to the laser cavity that reduces the useful output power that can be obtained from the laser.

OBJECT OF THE INVENTION

It is therefore an object of the present invention to provide an injection modelocked Ti-sapphire laser system that produces a unidirectional laser oscillation that permits optimum utilization of the produced laser light.

Another object of the present invention is to provide such a laser system that produces unidirectional laser oscillation using a ring cavity without the introduction of any intracavity devices.

SUMMARY OF THE INVENTION

According to the present invention there is provided an injection modelocking Ti-sapphire laser system that produces a high pulse rate unidirectional laser oscillation through the application of a ring cavity laser that incorporates no intracavity devices to achieve unidirectional oscillation. An argon-ion or doubled $Nd:YVO_4$ laser preferably serves as the pump laser and a gain-switched diode laser serves as the seed laser. The method of operating such a laser system is also disclosed.

DESCRIPTION OF THE DRAWING

The FIGURE shows a schematic diagram of the unidirectional oscillating laser system of the present invention.

DETAILED DESCRIPTION

Figure 1:
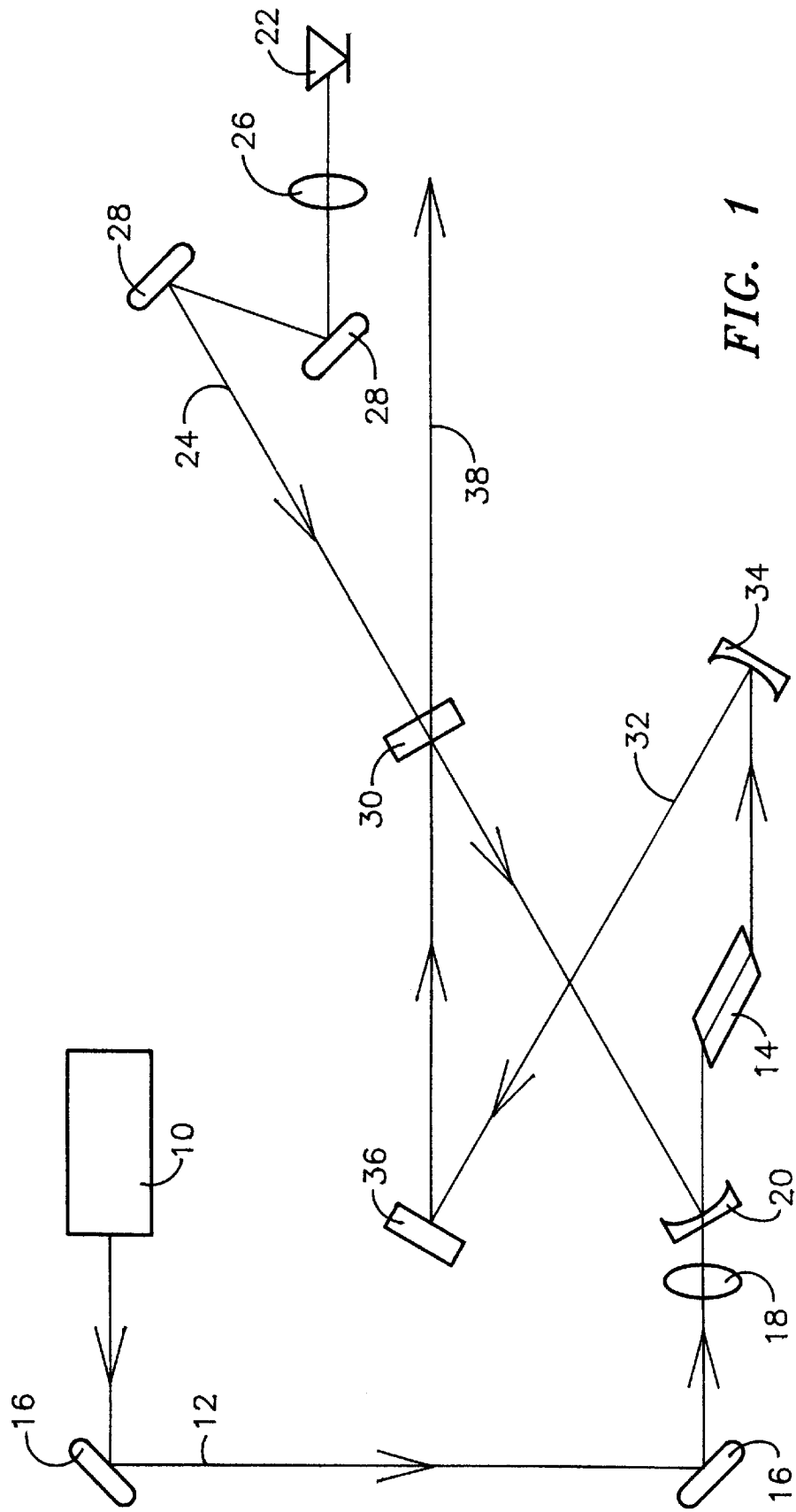

As shown in the FIGURE, the laser system of the present invention comprises a pump laser 10 that generates a pumping light beam 12 that is transmitted to Ti-sapphire crystal 14 by flat mirrors 16 and lens 18 and through a high reflective convex mirror 20. Gain-switched diode seed laser 22 generates a beam 24 that is transmitted to Ti-sapphire crystal 14 by lens 26, mirrors 28 and high reflective convex mirror 20 through optical coupler 30. Beam 32 produced by Ti-sapphire crystal 14 is directed out of the system by high reflective convex mirror 34 and high reflective flat mirror 36 and via optical coupler 30. Beam 38 as it exits from the system exhibits a unidirectional oscillation that has been imparted thereto without the use of any intracavity devices. Substantially all of the light energy produced by Ti-sapphire crystal 14 has been retained and usefully extracted from the system without any losses due to the design of the system or the incorporation of any intracavity devices. The use of optical coupler 30 as both the input coupler for seed laser 22 as well as the output coupler for Ti-sapphire crystal 14 permits this efficiency of operation.

In the absence of seed laser 22, the conventional ring cavity Ti-sapphire laser, i.e., the system shown in the FIGURE absent the seed laser, emits DC laser light and laser oscillation within the cavity is bi-directional. When the output beam 24 of seed laser 22 is directed into the ring cavity laser, as described hereinabove, Ti-sapphire crystal 14 is modelocked and laser oscillation is unidirectional.

A modified commercial Ti-sapphire laser, Spectra Physics Model 3900 operating at about 870 nm is used as the source of Ti-sapphire crystal 14. The Ti-sapphire crystal, about 20 mm×5 mm dia., is mounted on a water-cooled copper heat sink. Pump laser 10 is focused on Ti-sapphire crystal 14 using lens 18. About 80% of the pump laser light is absorbed. Multiline pump laser 10 produces about 6 W of green light.

Seed laser 22 is gain-switched in the usual way as described, for example in P. T. Ho, in Picosecond Optpoelectronic Devices, C. H. Lee (Ed.), Academic Press, New York, 1984. Seed laser 22 is biased near the threshold and an RF signal (about 1 W) of the appropriate frequency added using a bias-tee network. Comparable gain-switched diode laser performance is obtained with or without a step recovery diode (i.e., comb generator) following the RF generator. A 47-ohm resistor is used for impedance matching, although this element also can be removed without degradation of gain-switched diode performance. The average output power from gain-switched diode laser 22 is approximately 5 mW. The wavelength of gain-switched diode laser 22 output is about 859 nm. Beam 24 passes through optical coupler 30 and then directed into Ti-sapphire crystal 14 by high reflectivity convex mirror 20. Care is exercised to orient the polarization of beam 24 parallel to the c-axis of Ti-sapphire crystal 14.

As is apparent from the FIGURE, in the described configuration, optical coupler 30 serves as both the input coupler for seed laser 22 and the output coupler for Ti-sapphire crystal 14. This allows decoupling of seed laser 22 and Ti-sapphire crystal 14 and thereby permits efficient use of all of the Ti-sapphire laser light leaving the system. In the linear, folded cavity laser described in our 1998 paper referenced hereinabove, such decoupling would not be possible. As a consequence, laser oscillation is bidirectional and at least a portion of Ti-sapphire crystal output beam 32 is "wasted" or perhaps more accurately, dissipated.

Additionally, when laser oscillation is unidirectional, there is not standing wave within the laser gain medium, i.e., no electric field nodes or anti-nodes. The absence of a standing wave in the gain medium helps ensure that amplification within the laser crystal is very uniform along the length of the crystal thereby providing a more power stable laser output.

In operation, the Ti-sapphire crystal 14 output goes to pulsed modelocked over a broad range of seed laser wavelengths. Specifically, Ti-sapphire crystal 14 modelocks for seed laser wavelengths of 780 nm, 820 nm and 860 nm while the Ti-sapphire crystal wavelength remains at about 870 nm. This phenomenon indicates that the injection modelocked laser of the present invention is robust and not extremely sensitive to seed laser/Ti-sapphire laser wavelength mismatches. With the modelocking technique described herein, the pulse repetition rate of the modelocked laser system can be synchronized to the pulse repetition rate of seed laser 22 that, in turn, can be easily and accurately locked to an external frequency source.

It is believed that modelocking occurs as a result of gain modulation caused by the presence of the seed laser beam within the Ti-sapphire crystal. The pulsed seed laser 22 extracts gain from Ti-sapphire crystal 14 which effectively serves to provide period loss in a manner similar to an acoustooptic modulator in a conventional modelocked laser. Pulsed operation is clearly evident from measurements of the RF spectrum of the output using a fast photodiode and a fast digitizing oscilloscope.

Pulse repetition rates in excess of 125 MHz and up to 1.56 GHz have been achieved using the system described. It is postulated that even higher pulse repetition rates are readily achievable.

As the invention has been described, it will be apparent to those skilled in the art that the same may be varied in many ways without departing from the spirit and scope of the invention. Any and all such modifications are intended to be included within the scope of the appended claims.

What is claimed is:

1. An injection modelocking Ti-sapphire laser system that produces a unidirectional laser oscillation comprising:
   A) a pump laser that directs an output beam to;
   B) a Ti-sapphire crystal that produces an output beam;
   C) a gain switched diode seed laser producing an output beam that is also directed via an optical coupler and at least one high reflectivity convex mirror and parallel to said pump laser output beam to said Ti-sapphire crystal; and
   D) an arrangement of convex and flat high reflectivity mirrors that direct said Ti-sapphire crystal output beam to said optical coupler and out of the Ti-sapphire laser system as a unidirectional oscillating modelocked output having a pulse rate in excess of 125 MHz.

2. The injection modelocking Ti-sapphire laser system of claim 1 wherein said pump laser is selected from the group consisting of argon-ion and double Nd:YVO$_4$ lasers.

3. The injection modelocking Ti-sapphire laser system of claim 2 wherein said pump laser output beam is focused into said Ti-sapphire laser crystal with a lens.

4. The injection modelocking Ti-sapphire laser system of claim 1 wherein said gain switched diode seed laser output beam is focused along the c-axis of said Ti-sapphire crystal.

5. The injection modelocking Ti-sapphire laser system of claim 1 wherein the wavelength of said Ti-sapphire crystal ranges from about 859 to about 870 nm and the output of said seed laser has a wavelength of 720 nm, 820 nm or 860 nm.

6. A method for producing a pulsed unidirectional oscillating laser light beam exhibiting a pulse repetition rate in excess of 125 MHz comprising:
   a) directing the laser light output of a pump laser into a Ti-sapphire laser crystal thereby producing a Ti-sapphire laser crystal output beam;
   b) simultaneously directing the laser light output of a gain-switched diode seed laser into said Ti-sapphire laser crystal parallel to said pump laser laser light output via an optical coupler; and c) directing said Ti-sapphire laser crystal output beam through said optical coupler.

7. The method of claim 6 wherein said pump laser is selected from the group consisting of argon-ion and double Nd:YVO$_4$ lasers.

8. The method of claim 6 wherein said pump laser output beam is focused into said Ti-sapphire laser crystal with a lens.

9. The method of claim 6 wherein said gain switched diode seed laser output beam is focused along the c-axis of said Ti-sapphire crystal.

10. The method of claim 6 wherein the wavelength of said Ti-sapphire crystal ranges from about 859 to about 870 nm and the output of said seed laser has a wavelength of 720 nm, 820 nm or 860 nm.

* * * * *